United States Patent [19]
Greenhalgh

[11] Patent Number: 5,884,872
[45] Date of Patent: Mar. 23, 1999

[54] OSCILLATING FLAP LIFT ENHANCEMENT DEVICE

[75] Inventor: Samuel Greenhalgh, Doylestown, Pa.

[73] Assignee: The United States of America as represented by the Secretary of the Navy, Washington, D.C.

[21] Appl. No.: 528,622

[22] Filed: Aug. 30, 1995

Related U.S. Application Data

[60] Continuation-in-part of Ser. No. 245,083, May 17, 1994, abandoned, which is a division of Ser. No. 67,763, May 26, 1993, Pat. No. 5,335,886.

[51] Int. Cl.$^6$ ....................................................... B64C 9/02
[52] U.S. Cl. .......................... 244/201; 244/215; 244/130; 244/72
[58] Field of Search ...................................... 244/204, 205, 244/198, 75 R, 11, 72, 60, 62

[56] References Cited

U.S. PATENT DOCUMENTS

| | | | |
|---|---|---|---|
| 1,625,012 | 4/1927 | Worman | 244/72 |
| 1,655,704 | 1/1928 | Kauffman | 244/72 |
| 2,014,251 | 9/1935 | Gargiulo | 244/11 |
| 2,514,639 | 7/1950 | Haack | 244/72 |
| 4,081,155 | 3/1978 | Kuan | 244/72 |

Primary Examiner—Galen L. Barefoot
Attorney, Agent, or Firm—Ron Billi

[57] ABSTRACT

A lift enhancing device for a solid wing is disclosed wherein a where a motor driven, flap dynamically oscillating flap mechanism produces an increase in the lifting capabilities of the wing.

8 Claims, 6 Drawing Sheets

MODIFIED REDUCED FREQUENCY

LIFT COEFFICIENT VS ANGLE OF ATTACK, SOLID WING, 14.5% FLAP, AMPLITUDE +/-12 DEG, FREQUENCY 0 TO 60 Hz.

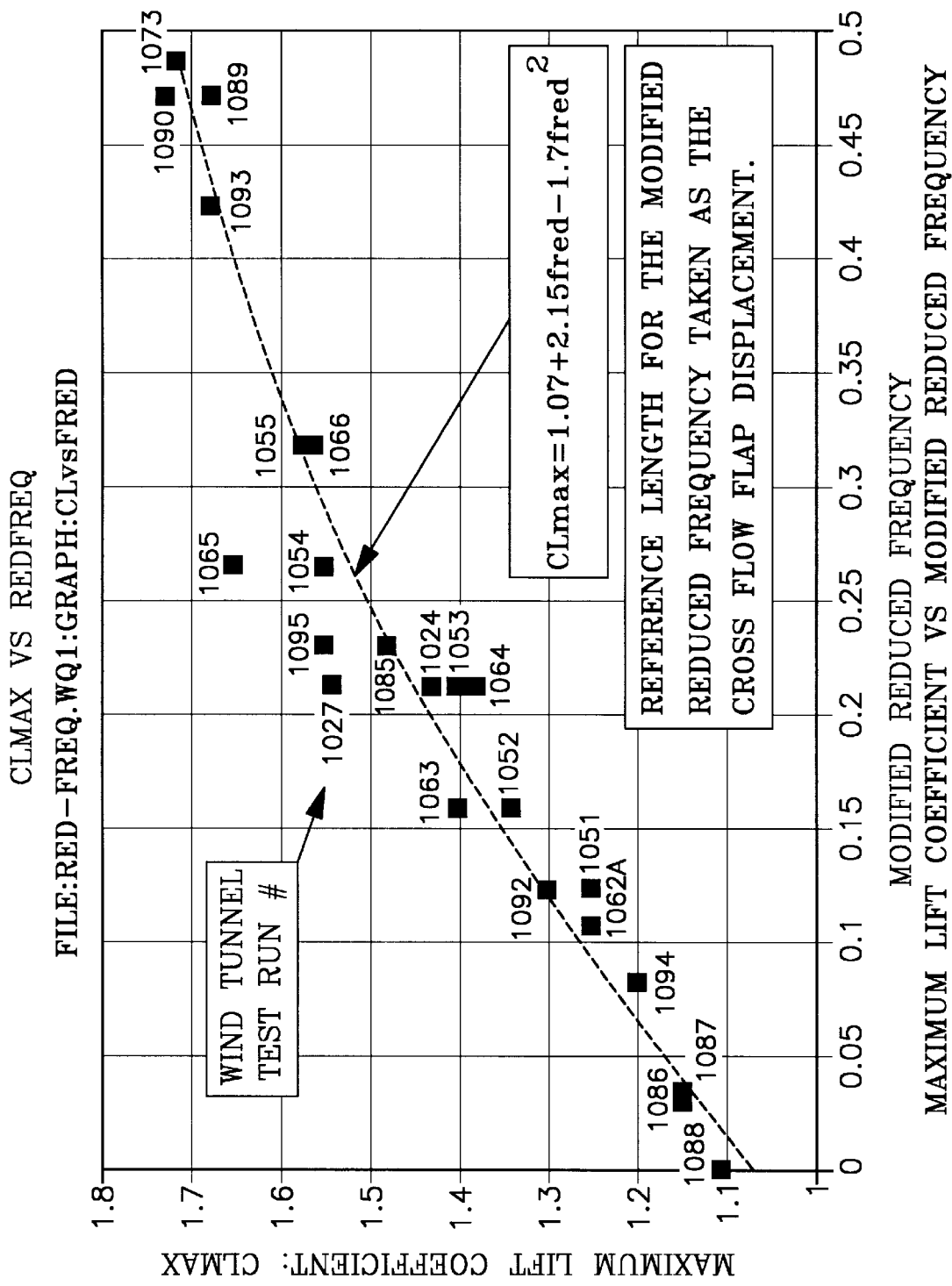

OSCILLATING FLAP LIFT ENHANCEMENT DEVICE

RELATED U.S. APPLICATION DATA

This is a continuation-in-part of U.S. application Ser. No. 08/245,083 filed on May 17, 1994, now abandoned which in turn is a division of U.S. Ser. No. 67,763 filed May 26, 1993 now U.S. Pat. No. 5,335,886 issued Aug. 9, 1994.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to improved lifting capabilities of a solid wing that has a motor driven, flap mechanism that oscillates over a range of frequencies and over a range of angular deflections.

Over the past few years, there has been a great deal of interest in unsteady aerodynamics in several areas of air vehicle research from fighter aircraft to missile dynamics. Generally, the research falls into two basic categories: unsteady effects that produce destructive vibrational effects with detrimental stability and control, and those effects that may be used in a positive way. Aerodynamic research involving wings and airfoils continues to search for ways to improve the lifting characteristics of airfoils by whatever means for purposes of improved flight parameters, larger payload capability or better handling characteristics at predetermined velocities. Towards this end, U.S. Pat. No. 4,867,396 to Barnaby S. Wainfan, issued on Sep. 19, 1989, and assigned to the Lockheed Corporation discloses that it is known to fixedly attach a small flap-like device to the trailing edge of an airfoil to improve the coefficient of lift and reduce the coefficient of drag. The flap is a flat, single plate-like member having a length of between 0.5% to 1.50% of the chord of the airfoil and is fixedly positioned at a downward angle to the chord of between 5° and 25°. Preferably, the length of the flap is approximately 1% of the chord and the preferred angle to the chord is 20°. It has been found that the above change in the aerodynamic characteristics provides an overall increase in fuel efficiency. However, this improvement still falls short of providing the dramatic improvement in lift characteristics that is obtained by the present invention.

Also in Arena, U.S. Pat. No. 5,098,043, a flap is rotatably connected to a wing and the flap is deflected in a purely static manner. The present invention is a dynamically oscillating flap that produces an increase in the lifting capabilities of the wing. This increase in the lift is particularly effective at set frequencies and at predetermined angular deflections.

SUMMARY OF THE INVENTION

It is therefore an object of the present invention to improve the lifting capabilities of a wing;

It is a further object of the present invention to improve the lifting capabilities of a wing at high angles of attack;

It is a still further object of the present invention to improve the lifting capabilities of a wing over the normal operating range of angles of attack from −10 to +20 degrees and to allow the wing to produce a boost in the lift in the +10 to +20 degrees angle of attack.

These and other objects and many attendant advantages of the present invention are obtained where a motor driven, flap mechanism, oscillates at a set of frequencies and at a predetermined angular deflection.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 7 is a plot showing how the maximum lift coefficient increases as the Modified Reduced Frequency is increased.

DESCRIPTION OF THE PREFERRED EMBODIMENT

Figure 1:
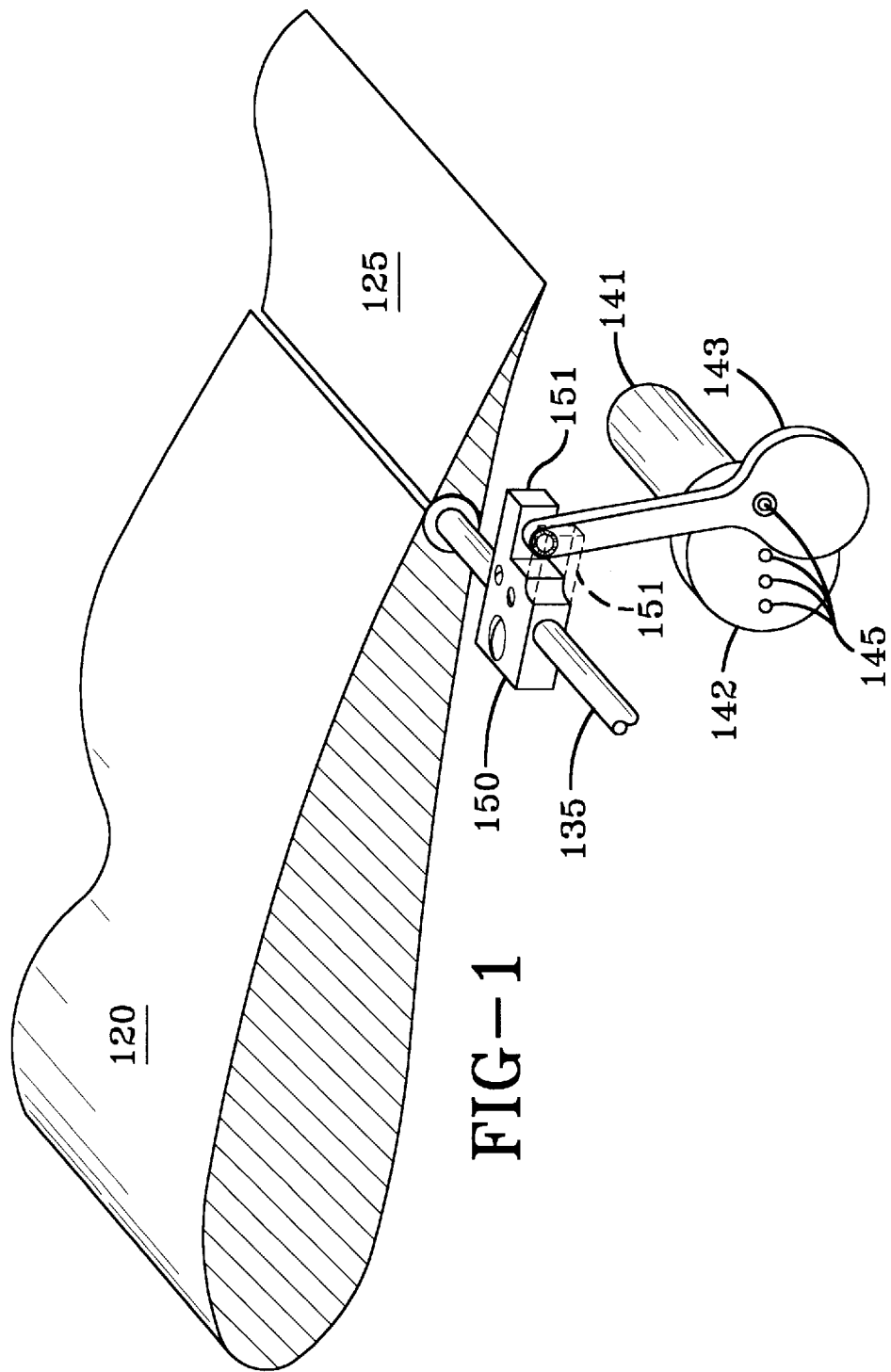
FIG. 1 shows a fragmentary perspective view of a solid wing with power means attached to drive a solid flap.
Figure 2:
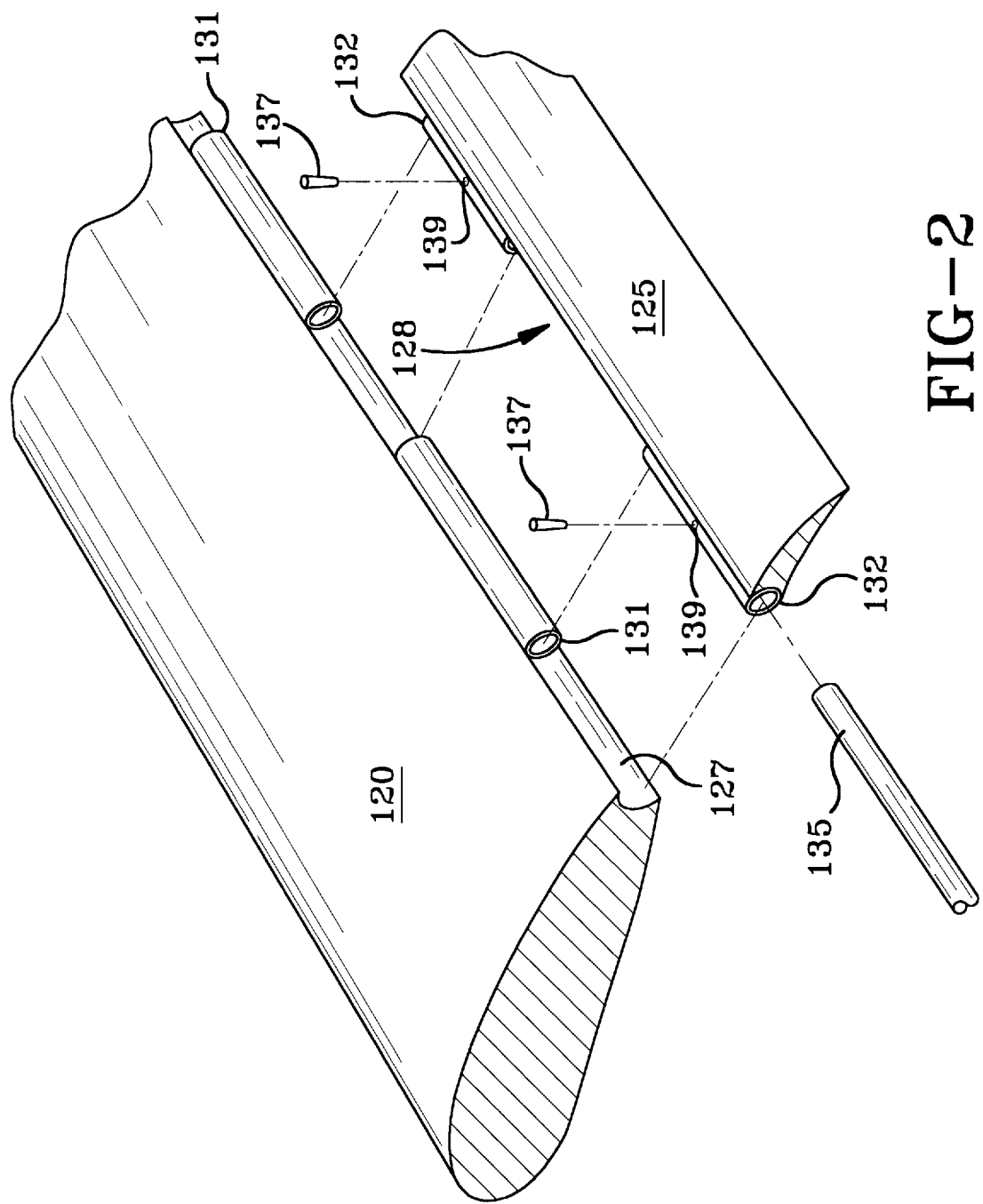
FIG. 2 shows a fragmentary and expanded perspective view of the wing of FIG. 1, showing the means of attachment of the trailing edge flap to the wing.

FIGS. 1 through 4 show an embodiment of the oscillating wing. FIG. 1 shows a partially broken-away, perspective view of a solid wing 120 having a mechanically driven flap 125 attached to oscillate about a hinge line. As seen in FIG. 2, wing 120 has a plurality of hinge tubes 131 fixed, as by gluing, to its trailing edge 127. Flap 125 has a plurality of hinge tubes 132 fixed, as by gluing, to its leading edge 128 in such a spaced apart relationship such that when flap 125 is brought adjacent to the trailing edge of wing 120, hinge tubes 132 fit in-between tubes 131 to form a uniform centerline therein and accommodate drive rod 135. As shown in FIG. 2, drive rod 135 is connected to hinge tubes 132, and hence, to flap 125, through the use of tapered drive pins 137. After rod 135 is fitted into hinge tubes 131, 132, pins 137 are secured through openings 139 into rod 135.

Figure 3:
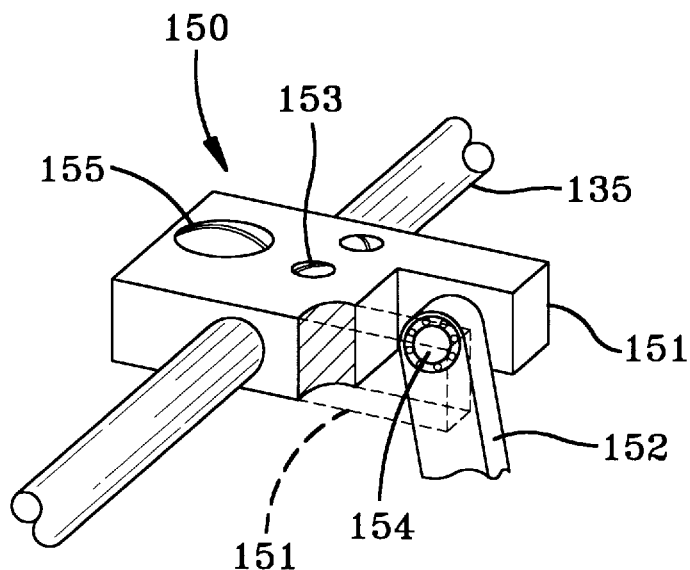
FIG. 3 shows an isolated view of the connection of the power means of FIG. 1 to the solid rod.
Figure 4:
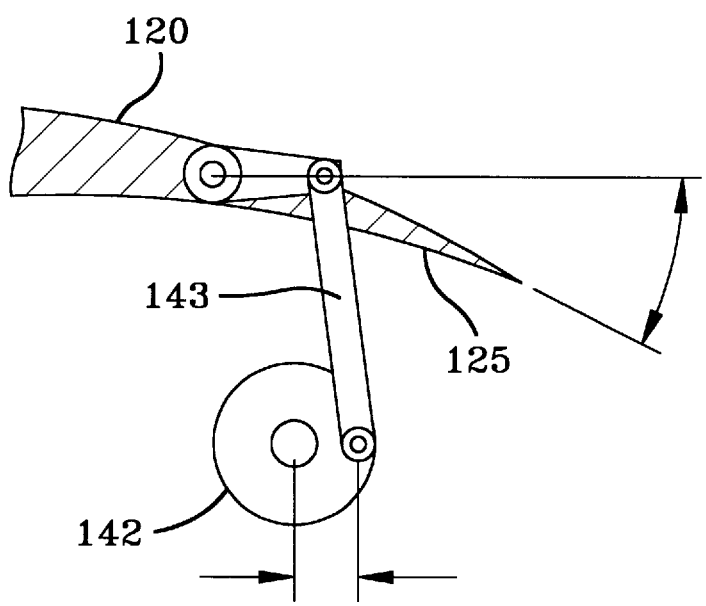
FIG. 4 shows a side view of the connection means of FIG. 3.

An electric motor 141 is connected to drive rod 135 to supply power to the mechanism. A connecting link 143 is, at one end, adjustably fixed, as at one of a plurality of locations 145, to crank plate 142, and, at the other end, to a lever 150. FIG. 3 shows an enlarged, isolated view of lever 150 with one of side arms 151 broken away to show the bearings 152 at the pin joint 154. By changing the radial location or position at the lower end of connecting link 143 relative to the center of rotation of crank plate 142, the displacement angle of flap 125 can be varied (see FIG. 4). In FIG. 3, it can be seen that two set screws 153 are used to fix the position of lever 150 relative to drive rod 135. Screws 153 allow flap 125 to be rotated or turned relative to the driving forces and therefore set with either a positive or negative bias. The drive rod 135 is oscillated by the lever 150 and the set screws 153 allow the wing flap to be rotated or turned relative to the lever 150, hence the flap can be set with a positive or negative initial angular displacement as a general flap setting. Additionally, a lead weight 155 is set into the end of lever 150 to allow for the balancing of inertial forces of flap 125 and the connecting link 142 and also to account for the balancing of the inertia forces of some portion of the oscillating connecting rod mass 135.

The physics of the phenomena is as follows. Without the oscillating flap, the upper surface boundary layer of the wing separates at an angle of attack of about 10 degrees. With the oscillating flap the separated upper surface boundary layer becomes reattached or, in other words, with the oscillating flap turned on, boundary layer separation is delayed. This reattachment of the boundary layer produces up to a 54% increase in maximum lift and increases the angle at which the maximum lift occurs by up to eight degrees. It should be noted that both of these effects would be of great importance for the modem fighter aircraft where high angle of attack maneuverability gives an aircraft a great advantage over an opponent in a close combat situation.

Figure 5:
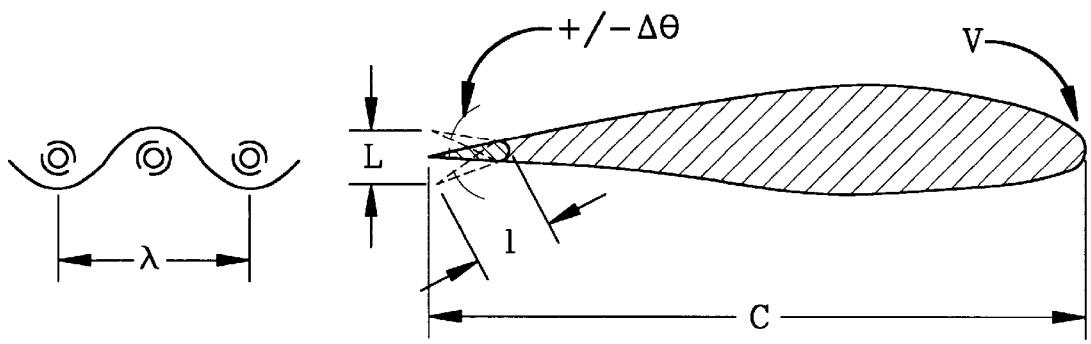
FIG. 5 shows the derivation of the modified reduced frequency equation

FIG. 5 is an illustration of the definition of the Modified Reduced Frequency. The Modified Reduced Frequency is a non-dimensional number that is calculated by dividing the product of the circular frequency "$\omega$" and the crossflow reference length "L" by twice the free stream air velocity "$V_\infty$". The circular frequency "$\omega$" is equal to $2\pi f$ where "f" is the flap oscillation frequency and "L" is twice the flap length "l," multiplied by the "sine $\Delta\theta$", and "$\Delta\theta$" is the oscillating angular displacement. An alternative definition of the Modified Reduced Frequency is also illustrated in FIG. 5. The Modified Reduced Frequency can be expressed and calculated by taking the ratio of crossflow reference length "L" to the wave length "$\lambda$" multiplied by "$\pi$". "$\lambda$" is the wave length between the pairs of vortices that are shed at the trailing edge of the wing.

Figure 6:
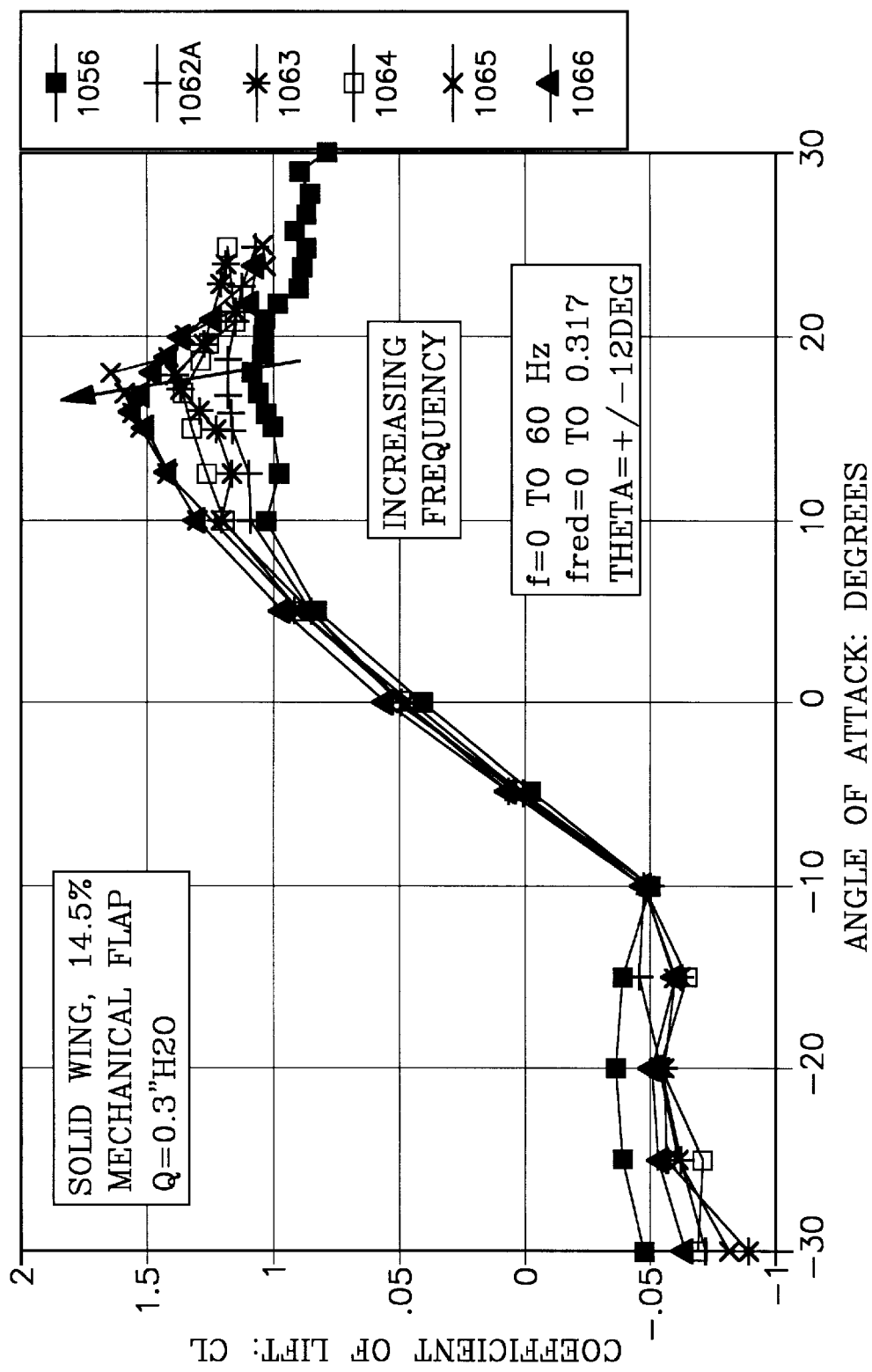
FIG. 6 is a plot of experimental data showing lift coefficient vs wing angle of attack.

FIG. 6 is a plot of experimental data showing lift coefficient vs wing angle of attack showing the effects of oscillating the 14.4% chord flap +/−12 degrees over a frequency range of 0 to 60 hz. The figure shows that the present invention provides a large lift enhancement in the +10 to −20 angle-of-attack range.

The plot in FIG. 7 shows how the maximum lift coefficient increases as the so called Modified Reduced Frequency is increased. An increase in the lift coeffecient is shown for all values of the modified reduced frequency from 0.04 to 0.048. There is a lift increase of 54% for a modified reduced frequency of 0.048.

Finally, while the oscillating flapped wing has been described with reference to a particular embodiment, it should be understood that the embodiment is merely illustrative as there are numerous variations and modifications, such as shape and thickness of the flap, which may be made by those skilled in the art. Thus, the invention is to be construed as being limited only by the spirit and scope of the appended claims.

What I claim is:

1. An apparatus for increasing the lift of an aircraft comprising:

a) a wing having a leading edge and a trailing edge, the wing capable of providing lift;

b) a flap having a leading edge and a trailing edge, the leading edge of the flap pivotally attached to said trailing edge of said wing;

c) means for oscillating said flap; wherein said wing, said flap and said oscillating means communicate to maintain said flap in a predetermined stationary position at angles of attack less than 10 degrees and cause said flap to oscillate at angles of attack equal to or greater than 10 degrees.

2. The apparatus defined in claim 1, wherein said flap oscillates through an angle of up to +/−12 degrees.

3. The apparatus defined in claim 1, wherein said flap oscillates at a frequency of up to 70 hertz.

4. The apparatus defined in claim 1, wherein said flap oscillates through an angle of up to +/−12 degrees and at a frequency of up to 70 hertz.

5. A method for increasing the lift of an airfoil, the airfoil having a fixed forwardly portion for providing lift and a rearwardly portion for oscillating, the rearwardly portion pivotally attached to the forwardly portion, and also having means for oscillating said rearwardly portion, the method comprising the steps of:

a) maintaining said rearwardly portion in a fixed relationship with respect to said forwardly portion at angles of attack less than 10 degrees;

b) oscillating said rearwardly portion with respect to said forwardly portion at angles of attack equal to or greater than 10 degrees.

6. The method defined in claim 5, wherein said rearwardly portion oscillates at a frequency of up to 70 hertz.

7. The method defined in claim 5, wherein said rearwardly portion oscillates through an angle of up to +/−12 degrees.

8. The method defined in claim 5, wherein said rearwardly portion oscillates at a frequency of up to 70 hertz and oscillates through an angle of up to +/−12 degrees.

* * * * *